Aug. 29, 1933.  M. G. T. PRIEST  1,925,004
BRAKE OR CLUTCH
Filed July 11, 1930   2 Sheets-Sheet 1

Inventor:—
M. G. T. Priest
by
Langner, Parry, Card & Langner
Attys.

Patented Aug. 29, 1933

1,925,004

UNITED STATES PATENT OFFICE 1,925,004

BRAKE OR CLUTCH

Martin George Turner Priest, New Plymouth, New Zealand, assignor to Priest's Brake Development Company, Limited, New Plymouth, New Zealand, a company of New Zealand Application July 11, 1930. Serial No. 467,309

6 Claims. (Cl. 188—78)

This invention relates to mechanically operated brakes and clutches of the type comprising a drum secured to and rotatable with a rotary or a driving member, and an expanding member located within the drum, adapted to be expanded from or by a member on a stationary or a driven member, to obtain a braking effect or a driving contact between the driven and the driving member.

The object of the present invention is to provide an improved form of expanding brake or clutch, said improved form comprising a drum secured to and rotatable with a rotary member; a plate formed with a recessed edge, secured to a fixed member or to a member to be rotated, enclosed by said drum, an expanding ring between the drum and the plate having turning movement about the latter; means for expanding and contracting the ring; and projections on the latter extending into the recesses of the plate and riding on the edges thereof, so that movement of said ring causes its outer surface to contact with or to move from the drum.

In order to reduce friction as much as possible, the projections from the expanding ring preferably consist of rollers mounted crossways of the ring, expansion of which into contact with the drum, can be brought about by any approved means, such as by a sleeve having turning movement on the fixed member, or the member to be rotated, in combination with eccentrics, straps, and other suitable parts.

Following contact of the expanding ring with the drum, the former tends to rotate with the latter, and by so doing carries the projections or rollers up the sides of the recesses aforesaid, thereby increasing the friction between said expanding ring and said drum.

A further object of the invention is to provide improved means for operating the before mentioned type of brake or clutch, said means comprising a sleeve attached to or forming part of a member turnable to bring about expansion of an expanding ring, said sleeve being loosely mounted on a fixed member or on a member to be rotated, and a further sleeve slidably keyed on said fixed or rotatable member, passing on the loosely mounted sleeve, and a pin or pins on one of the sleeves coacting with an inclined slot or slots in the other sleeve, so that sliding movement of the sliding sleeve effects turning movement of the other sleeve.

The sliding sleeve is slid in one direction by a spring, and is slid in the reverse direction against the action of the spring, by a suitably positioned and operated lever.

Figures 1, 2:
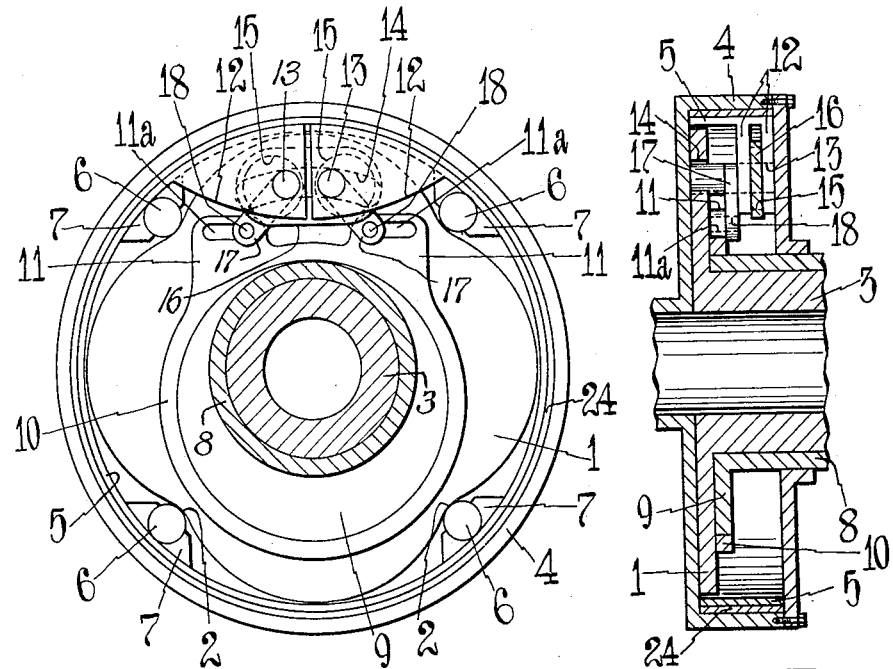
Figure 3:
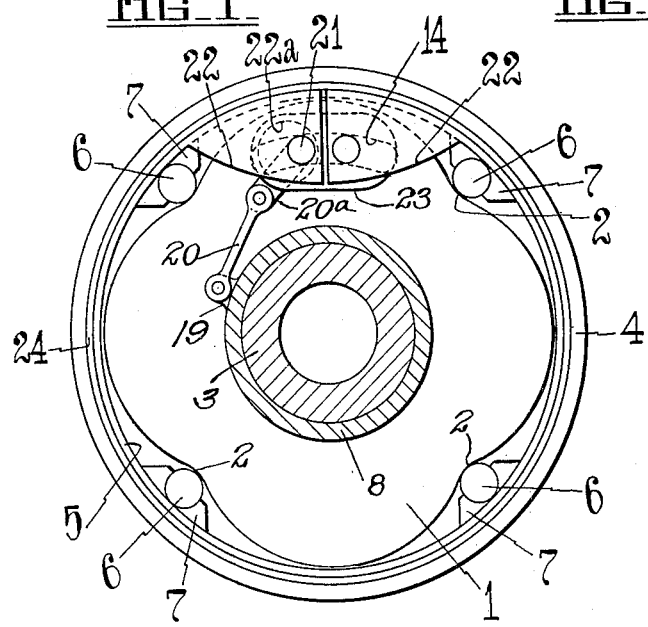
Figure 4:
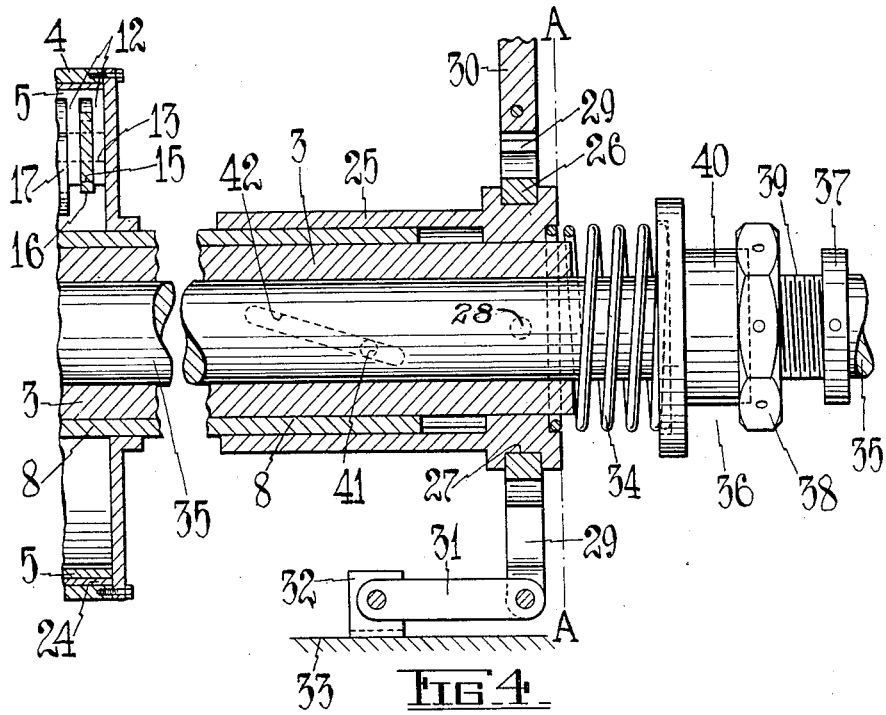
Figure 5:
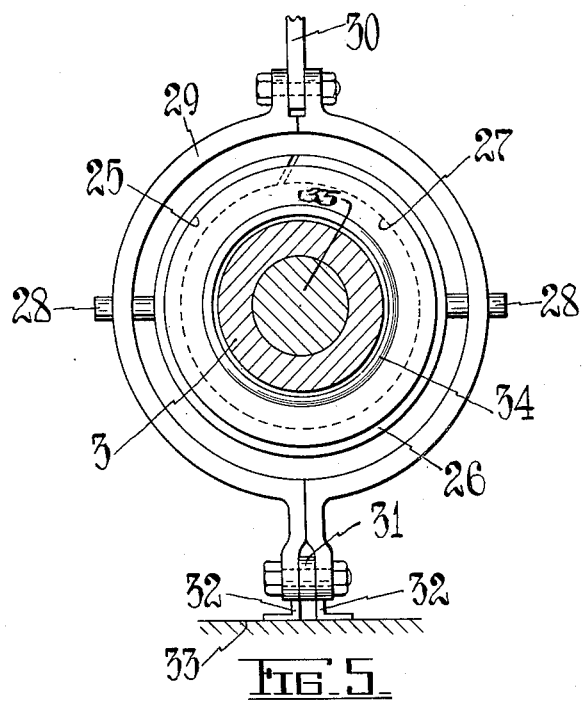

The invention is illustrated in the accompanying drawings and will be more particularly described in conjunction therewith, Fig. 1 being a sectional elevation, and Fig. 2 a cross sectional elevation of the improved brake or clutch, while Fig. 3 illustrates alternative means for causing expansion of the expanding ring, and Fig. 4 is a part sectional elevation at right angles to the view shown in Fig. 1, showing the means for operating the expanding ring, and Fig. 5 a cross sectional view at A—A, Fig. 4.

In carrying out the invention, a plate 1 having its periphery recessed such as by forming shallow scallops 2 therein, is secured to a member 3, which can be either a non-rotary or fixed member, as for instance the rear axle housing of a motor vehicle, or a shaft or other member it is desired to drive.

A drum 4 adapted to be secured to a rotary member such as a motor vehicle wheel, or to a driving pulley or shaft, encloses the plate 1, and also contains a split expansible ring 5, the latter carrying on its inner surface inward projections, preferably in the form of rollers 6 mounted in lugs 7 on the ring 5, and crossways of the latter, said projection or rollers 6 extending into the scallops or recesses 2.

A braking or a clutching effect between the drum 4 and the member 3 is obtained by expanding the split ring 5 until the frictional contact between the latter and the internal surface of the drum 4 is sufficient to cause said ring 5 to tend to turn with the latter about the plate 1, the effect of which is to cause the projections consisting of the rollers 6, to ride up the sides of the scallops 2, and further expand said ring 5 to increase friction between the latter and the drum 4 until, where the device is being used as a brake and the member 3 does not rotate, the drum 4 is prevented from turning, or where the device is being used as a clutch, the member 3 becomes locked, through the ring 5, rollers 6, and recessed plate 1, to the drum 4, and rotates with the latter.

Reverse action of the means employed for expanding the ring 5, draws the ends of the latter towards each other, and the rollers 6 back into the deepest parts of the scallops 2, whereby the said ring 5 is contracted and allows the drum 4 to rotate freely about it.

One form of mechanism for initiating expansion of the split ring 5 comprises a sleeve 8 surrounding the member 3, said sleeve 8 having mounted thereon an eccentric 9 the strap 10 of which is provided with lugs 11 containing slots 11a. Mounted in lugs 12 on the split ring 5, are small shafts 13 which pass through a slot 14 in the plate 1 before mentioned, each shaft 13 having keyed or otherwise secured thereon one or more eccentrics 15, opposed eccentrics being connected by straps or links 16, the small shafts 13 also having keyed or secured thereon arms 17 provided with pins 18, which are entered in the slots 11a in the lugs 11 of the strap 10 of the eccentric 9 on the sleeve 8. The latter can be given turning movement on the member 3 by any suitable means, to turn the eccentric 9 and impart radial movement to the strap 10, which in turn actuates the arms 17 on the small shafts 13 to turn same and the eccentrics 15, so that the latter force the ends of the split ring 5 apart, the small shafts 13 travelling in the slot 14.

A further form of mechanism for expanding the split ring 5 comprises an arm 19 on the sleeve 8, and a link 20 connecting the outer end of said arm 19 with a further arm 20a on an eccentric shaft 21 mounted between lugs 22 on one end of the split ring 5 and passing through the slot 14 in the plate 1, the eccentric 22a on the shaft 21 working in a strap or link 23 connected to the other end of the split ring 5.

Preferably a lining ring 24 is fitted in the drum 4 to take wear and facilitate adjustment of the device, which may become necessary owing to said wear.

The drum 4 can be oil tight, and be filled with oil, in which the working parts operate, or it may be fitted with an ordinary lining, and be run dry.

Means for imparting turning movement to the sleeve 8 carrying the eccentric 9 can comprise a further sleeve 25 slidably keyed on the member 3 and capable of being slid thereon and on the sleeve 8, per medium of a ring 26 loosely fitted in a circular groove 27 in said sliding sleeve 25, said ring 26 being provided with pins or trunnions 28 which are entered in opposite sides of a fork or ring 29 secured to the lower end of an operating lever 30.

The fork or ring 29 secured to the operating lever 30 is pivotally connected at its lower end or bottom portion to a link or links 31, in turn pivotally connected to a bracket or brackets 32 on a fixture 33.

A spring 34 surrounding a guide 35 is in compression between the sliding sleeve 25 and a stop 36, said stop comprising a collar 37, a nut 38 on a screw threaded portion 39 on the guide 35, and a flanged bushing 40 entered in the nut 38, with the flange presented to the spring 34. By adjusting the nut 38 on the screw threaded portion 39, the compression of the spring 34 can be regulated as desired.

The sleeve 8 formed integral with or secured to the eccentric 9 has one or more pins 41 projecting therefrom, the latter being each entered in an inclined slot or slots 42 in the sliding sleeve 25.

The spring 34 acting between the stop 36 on the guide rod 35 and the sliding sleeve 25 moves the latter in one direction and according to the direction of inclination of the slot or slots 42 imparts turning movement through the pin or pins 41 to the inner sleeve 8, whereby the eccentric 9 is turned to expand or contract the expanding ring 5.

Sliding movement of the sliding sleeve 25 against the action of the spring 34 is responsible for the reverse turning movement of the eccentric 9 and results in the movement or operation of the ring 5 being reversed.

What I do claim and desire to obtain by Letters Patent of the United States of America is:—

1. In a frictional coupling device of the kind described, means for operating an expanding ring, comprising a sleeve having an eccentric thereon and loosely mounted upon a member; a further sleeve slidably keyed on the latter and passing on the first mentioned sleeve; and a pin on one sleeve co-acting with an inclined slot in the other sleeve, whereby sliding movement of the sliding sleeve effects turning movement of the other sleeve, substantially as described and illustrated.

2. In a frictional coupling device of the kind described, operating means as in claim 1, wherein the sliding sleeve contains the inclined slot which pass upon a pin on the loosely mounted sleeve, substantially as described and illustrated.

3. In a frictional coupling device of the kind described, operating means as in claim 1, wherein a spring under compression slides the sliding sleeve in one direction and means for sliding said sliding sleeve in the reverse direction against the action of said spring, substantially as described and illustrated.

4. A frictional coupling device comprising a drum secured to and rotatable with a rotary member, a plate having a recessed edge secured to a fixed member and enclosed by said drum, an expanding ring between said drum and said plate, said ring having a turning movement about said plate, means for expanding and contracting said ring, projections on said ring extending into the recesses of said plate and adapted to ride upon the edges of said plate so that movement of said ring will cause the outer surface thereof to contact with said drum, said means for expanding and contracting said ring comprising a main eccentric surrounding said fixed member, a strap surrounding said main eccentric, lugs upon said ring, shafts mounted in said lugs, eccentrics mounted on said shafts, said plate having slots therein through which said shafts extend, straps connecting opposed eccentrics, arms on the shafts of said eccentrics connected with said main eccentric strap, a sleeve turnable upon said fixed member, said main eccentric being mounted on said sleeve and said main eccentric strap being provided with slotted lugs and pins upon the arms of said eccentric shafts extending into said slots.

5. A frictional coupling device comprising a drum secured to and rotatable with a rotary member, a plate having a recessed edge secured to a fixed member and enclosed by said drum, an expanding ring between said drum and said plate, said ring having turning movement about the latter, means for expanding and for contracting said ring, projections on said ring extending into the recesses of said plate and riding on the edges thereof so that movement of said ring causes its outer surface to contact with or to move from said drum, said means for expanding and contracting said ring comprising a main eccentric and strap surrounding said fixed member, eccentrics on shafts mounted in lugs on said ring and passing through a slot in said recessed plate, straps connecting opposed eccentrics and arms on the shafts of the latter connected with the main eccentric strap.

6. A frictional coupling device comprising a drum secured to and rotatable with a rotary member, a plate having a recessed edge secured to a fixed member and enclosed by said drum, an expanding ring between said drum and said plate, said ring having turning movement about the latter, means for expanding and for contracting said ring, projections on said ring extending into the recesses of said plate and riding on the edges thereof so that movement of said ring causes its outer surface to contact with or to move from said drum, a sleeve turnable on said fixed member, an arm on said sleeve, a link connecting said arm with an arm on the shaft of an eccentric on one end of the expanding ring and a strap connecting said eccentric with the other end of said expanding ring.

MARTIN GEORGE TURNER PRIEST.